United States Patent [19]
Tojo et al.

[11] Patent Number: 5,737,014
[45] Date of Patent: Apr. 7, 1998

[54] ELECTRONIC CAMERA WITH DETACHABLE BUFFER MEMORY

[75] Inventors: Akihiko Tojo, Kanagawa-ken; Takao Kinoshita, Tokyo; Takemi Tanno, Kanagawa-ken; Nobuo Tezuka, Kanagawa-ken; Shinji Sakai, Kanagawa-ken; Yasutomo Suzuki, Kanagawa-ken; Seiichi Ozaki, Kanagawa-ken, all of Japan

[73] Assignee: Canon Kabushiki Kaisha, Tokyo, Japan

[21] Appl. No.: 413,780

[22] Filed: Mar. 16, 1995

Related U.S. Application Data

[63] Continuation of Ser. No. 125,289, Sep. 22, 1993, abandoned, which is a continuation of Ser. No. 908,449, Jun. 30, 1992, abandoned, which is a continuation of Ser. No. 660,222, Feb. 20, 1991, abandoned, which is a continuation of Ser. No. 418,699, Oct. 2, 1989, abandoned, which is a continuation of Ser. No. 131,824, Dec. 11, 1987, abandoned.

[30] Foreign Application Priority Data

Dec. 18, 1986 [JP] Japan ................... 61-302215

[51] Int. Cl.$^6$ ............................................. H04N 5/225
[52] U.S. Cl. .................... 348/220; 348/231; 348/208
[58] Field of Search ............................... 348/207, 220, 348/372, 373, 374, 375, 376, 231, 232, 221, 233; 358/335, 906; 386/48, 117, 118; H04N 5/335, 5/225

[56] References Cited

U.S. PATENT DOCUMENTS

| | | |
|---|---|---|
| 4,420,773 | 12/1983 | Toyoda . |
| 4,456,931 | 6/1984 | Toyoda . |
| 4,489,351 | 12/1984 | d'Alayer de Costemore d'Arc . |
| 4,553,170 | 11/1985 | Aoki . |
| 4,739,417 | 4/1988 | Ogawa . |
| 4,792,863 | 12/1988 | Urabe . |
| 4,897,732 | 1/1990 | Kinoshita et al. ............... 348/335 |

FOREIGN PATENT DOCUMENTS

| | | |
|---|---|---|
| 139422 | 10/1979 | Japan . |
| 140510 | 10/1979 | Japan . |
| 165077 | 12/1980 | Japan . |
| 58468 | 4/1982 | Japan . |
| 183582 | 10/1984 | Japan . |
| 213183 | 10/1985 | Japan . |
| 284889 | 12/1986 | Japan ............... 358/906 |
| 2089169 | 6/1982 | United Kingdom . |

*Primary Examiner*—Andrew Faile
*Assistant Examiner*—Tuan V. Ho
*Attorney, Agent, or Firm*—Robin, Blecker, Daley & Driscoll

[57] ABSTRACT

An electronic camera including an image pickup element, a solid state memory of relatively small capacity for storing at least one frame of a video signal produced by the image pickup element and a non-solid state memory of relatively large capacity for storing the video signal stored in the solid state memory, wherein these memories each are made releasably attached to the image pickup element.

28 Claims, 4 Drawing Sheets

VD (VERTICAL SYNCHRONIZING)

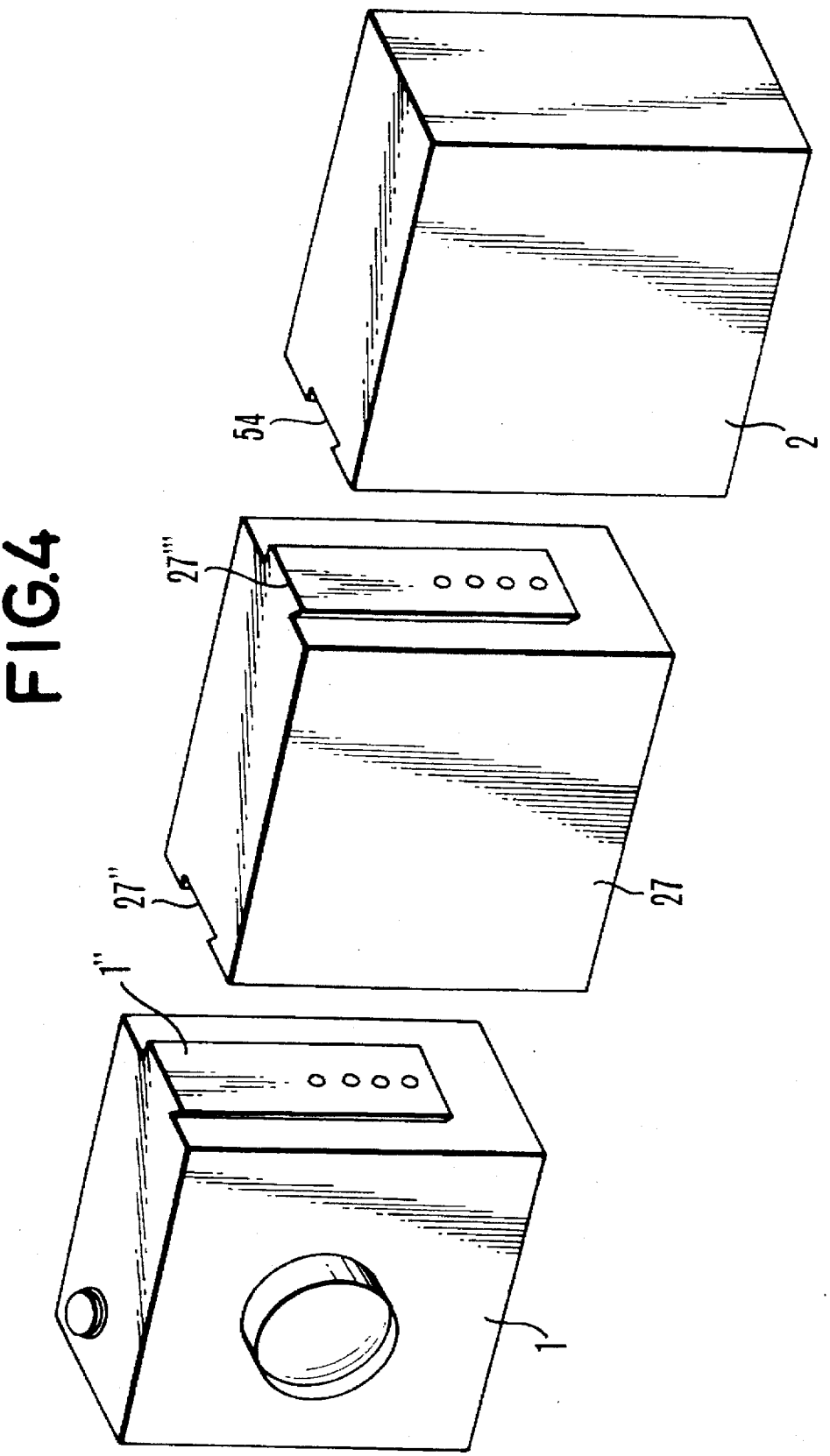

ELECTRONIC CAMERA WITH DETACHABLE BUFFER MEMORY

This is a continuation application under 37 CFR 1.62 of prior application Ser. No. 08/125,289, filed Sep. 22, 1993 (abandoned), which is a continuation of Ser. No. 07/908,449 filed Jun. 30, 1992 (abandoned), which is a continuation of Ser. No. 07/660,222 filed Feb. 20, 1991 (abandoned), which is a continuation of Ser. No. 07/418,699 filed Oct. 2, 1989 (abandoned), which is a continuation of Ser. No. 07/131,824 filed Dec. 11, 1987 (abandoned).

BACKGROUND OF THE INVENTION

1. Field of the Invention

This invention relates to electronic cameras or cameras in which an optical image is recorded electrically and, more particularly, to an electronic camera with a recorder using a non-solid state memory such as disk as the recording means.

2. Description of the Related Art

The conventional apparatus of this sort has been constructed from the image pickup portion for converting an optical image to an electrical signal, and a disk type recording portion for storing the electrical signal in electronic or magnetic recording medium.

As this type of recorder had drawbacks, in order to compensate for them, there are known the previous proposals that as the recording means, instead of the disk, use was made of a built-in solid state memory (for example, in Japanese Laid-Open Patent Application No. Sho 54-140510), or a releasably attached one (Japanese Laid-Open Patent Application No. Sho 54-139422).

Such prior known techniques had, however, the following drawbacks.

To begin with, the drawbacks of the electronic camera having its recording means made in the form of the disk recording portion are as follows:

(1) Since the recording disk and the driving device therefor are of certain minimum allowable size, there is a limitation on the reduction of the bulk and size of the camera whole;

(2) When an image recording operation is started, the ramping rotation of the disk takes a certain space of time. Hence, good shutter chances will often be missed; and (3) The consumption of current necessary to the disk servo is relatively large, and the proportion of the time the other operation than the net recording takes is long.

The use of the solid state memory in the electronic camera, on the other hand, gives the following drawbacks.

(1) Since the memory is of the standard capacity, for it is difficult to increase it, the maximum number of recordable picture frames is far smaller than when the disk is used; and (2) Because the cost of the memory cannot be much reduced, there is a limitation also on reduction of the cost of taking pictures.

To solve such problems, a novel electronic camera has been proposed in U.S. patent applications Ser. Nos. 054,591, 053,395 and 054,590 all filed May 12th 1987 corresponding respectively to Japanese Laid-Open Patent Applications Nos. Sho 62-62674, 62-62675 and 62-62676 all assigned to the assignee of the present invention. That is, a solid state memory which is built in the interior of the electronic camera is used in combination with a memory unit of large capacity which is releasably attached thereto as necessity arises.

Even in this case, however, there is the following problem: For the tourist, for example, the memory unit of large capacity has to be always carried around. Otherwise, many images could not be shot and preserved.

SUMMARY OF THE INVENTION

An object of the present invention is to provide an electronic camera which can solve such problems.

In an embodiment of the invention, the electronic camera is constructed with image pickup means, solid state memory means of relatively small capacity for storing a video signals for at least one frame from the image pickup means, and non-solid state memory means of relatively large capacity for storing that video signal which has been stored in, and is transferred thereto from, the solid state memory means, wherein these two memory means each are made releasably attached to the image pickup means.

In the embodiment of the invention, the video signal is formed in the image pickup means, and this is stored in the solid state memory means of small capacity. Moreover, the video signal once stored in this solid state memory means can be transferred to and stored in the non-solid state memory means of large capacity. Here, since the above-described solid state and non-solid state memory means are attachable to and detachable from the electronic camera, for the photographer on a walking tour, there is no need to carry the non-solid state memory means of large capacity about with him, if he has a number of spare solid state memory items in hand. With this, he becomes able to shoot many frames. Moreover, the camera of the invention is superior in the ability to take snap shots, too.

Other objects and features of the invention will become apparent from the following description and drawings.

BRIEF DESCRIPTION OF THE DRAWINGS

FIG. 4 is similar to FIG. 3 except that another embodiment of the invention is illustrated.

DETAILED DESCRIPTION OF THE PREFERRED EMBODIMENTS

The present invention is next described in detail in connection with embodiments thereof by reference to the drawings.

Figure 1:
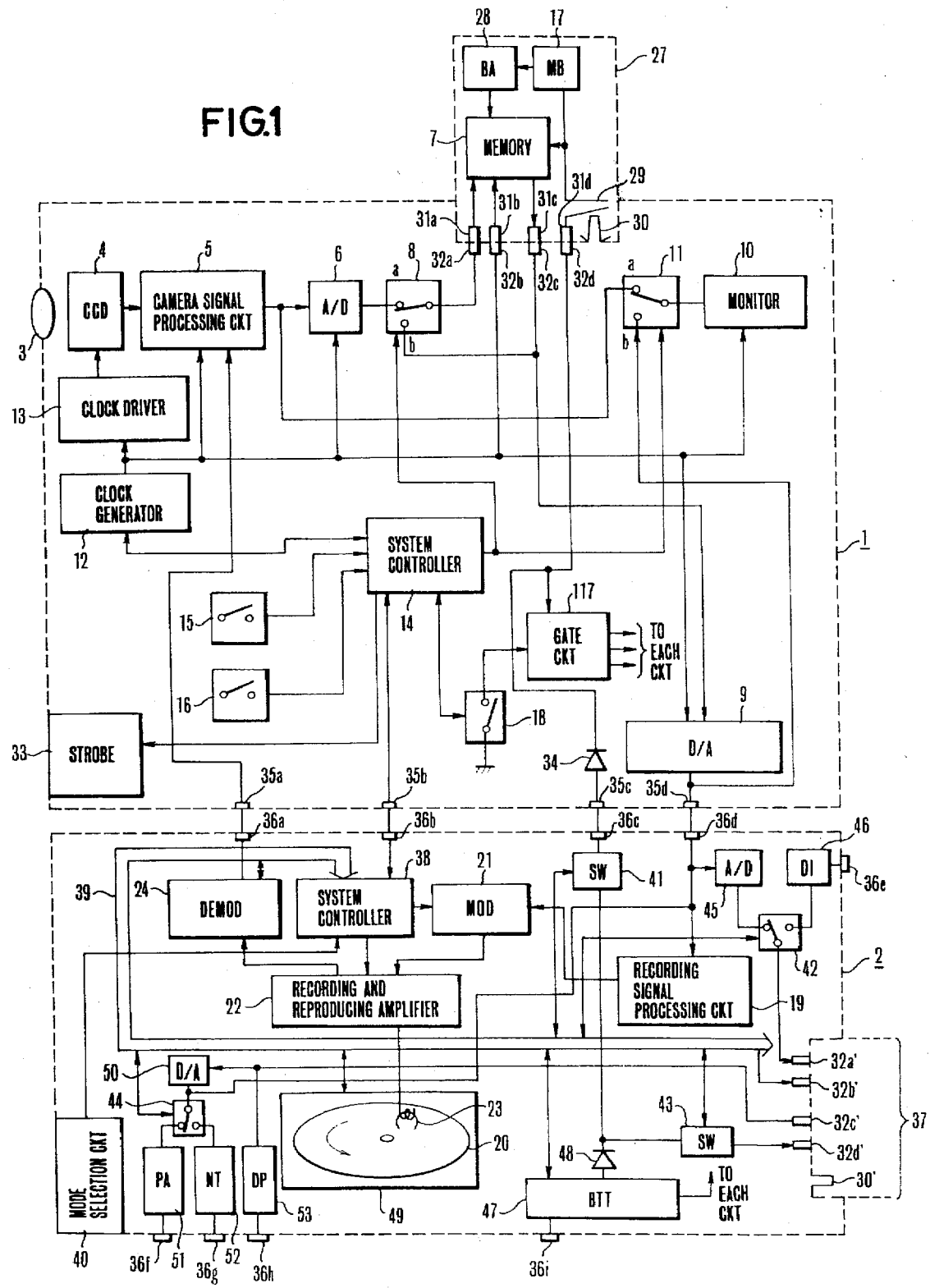
FIG. 1 is a diagram of an embodiment of the invention.

FIG. 1 is a block diagram illustrating the construction of an embodiment of an electronic camera according to the present invention.

In this embodiment, the electronic camera basically comprises an imager 1 and a recorder 2 using a disk.

In the imager 1, a photographic lens 3 forms an optical image on an image pickup device 4 comprised of a CCD, MOS or image pickup tube and other means known to those skilled in the art to produce video signals, which are then processed by a signal processing circuit 5.

An A/D converter 6 produces digitized video signals which are stored in a solid state frame memory 7 of, for example, 10-frame capacity. This memory 7 may be of another type which stores the required number of fields. The frame memory 7 is in the form of a volatile DRAM as is suited thereto. For this reason, a changeover switch 8 is provided in between the A/D converter 6 and the frame memory 7, operating in such a manner that when the inputted video signals are successively recorded in the frame memory 7, its contact "a" is in ON state, while when the signal once memorized has to be preserved as it is, its contact "b" is instead set in ON state, so that the recorded signal is circulated. The video signal read out from the frame memory 7 is changed from the digital to the analog form by a D/A converter 9.

A monitor 10 receptive of the video signal displays a visible image.

A second changeover switch 11 has a contact "a" when "ON" to transfer the "live" video signals which have been successively sent from the image pickup element 4 through the signal processing circuit 5 to the monitor 10. At this time, the monitor 10 functions just as the viewfinder of the camera.

When its other contact "b" is set in "ON", the video signal from the frame memory 7 is sent through the D/A converter 9 to, and displayed on, the monitor 10. A clock generator 12 produces clock pulses which are supplied to the image pickup element 4, signal processing circuit 5, A/D converter 6, frame memory 7, D/A converter 9 and monitor 10. Thus, the various circuits within the imager 1 are driven by these pulses. In response to the output of the clock generator 12, a clock driver 13 drives the image pickup element 4.

A system controller 14 controls the switching operation of the first and second changeover switches 8 and 11 in accordance with the timing given by a release switch 15. The system controller 14 also is driven by the clock from the clock generator 13.

A main switch 16 controls the start and stop of the system controller 14.

An electrical power source or battery 17 has a power switch 18. The electrical power from the battery 17 is supplied to the various portions of the imager 1 and the disk recorder 2.

Next, in the disk recorder 2, a recording signal processing circuit 19 receptive of the output of the D/A converter 9 which changes the video signal on the frame memory 7 to the analog signal produces an output signal which is supplied to a recording disk 20.

The disk 20 as the recording medium is assumed here to be a magnetic sheet, but may be an optical disk or photo-magnetic disk.

An FM modulator 21, when the recording disk is the magnetic medium, changes the analog video signal from the D/A converter 9 to an FM signal and sends it to the recording disk 20.

A recording and reproducing amplifier 22 is used to amplify the signal when it is to be recorded on the magnetic disk 20, or when it is reproduced from a signal to be described later.

A recording and reproducing head 23 is used to put the signal in and out the recording disk 20.

An FM demodulator 24 for demodulating the reproduced signal from the recording and reproducing amplifier 22 or the FM signal produces an analog video signal at its output which is supplied to the camera signal processing circuit 5 of the imager 1. Therefore, similarly to the video signal from the image pickup element 4, the reproduced signal from the recording disk 20 can be displayed on the monitor 10.

A memory unit 27 contains the frame memory 7 and a backup electrical power source or battery 28 for the frame memory 7. This memory unit 27 is made attachable to and detachable from the imager 1. For note, both batteries 17 and 28 are rechargeable.

Interconnection terminals 31a–31d come into contact directly with those 32a–32d of the imager 1 when the unit 27 is attached to the imager 1. A switch 29 in between the terminal 31d and the battery 17 is arranged upon attachment of the unit 27 to the imager 1 to be turned on by a projected portion 30 inserting into a hole provided through the wall of the attachment panel of the unit 27. Therefore, the battery 17 is not short-circuited when the unit 27 is detached.

A strobe 33 is built in the imager 1 and has a booster circuit incorporated therein. For note, all the electrical circuits including this booster circuit are supplied with electrical power from the battery 17 in the memory unit 27. Therefore, recharging (or exchange) of the battery 17 is very easy to carry out.

A gate circuit 117 is turned on when the switch 18 is turned on, so that the battery 17 is connected to each circuit.

Interconnection terminals 35a–35d of the imager 1 come into contact directly with those 36a–36d of the recorder 2 when the imager 1 is attached to the recorder 2. For note, 34 is a reverse current preventing diode.

The recorder 2 is provided with a recessed portion 37 for use in attaching the memory unit 27 thereto. On its inner wall surface there are provided interconnection terminals 32a'–32d' similar to those 32a–32d described above.

A projected portion 30' similar to that 30 described above is also provided therein.

The recorder 2 has external terminals 36e–36i.

A system controller 38 controls the operation of each of the circuits in the recorder 2, and, when the imager 1 is attached to the recorder 2, communicates with the system controller 14 of the imager 1 so that the imager 1 and the recorder 2 are coordinated with each other. In the case when the imager 1 and the recorder 2 are out of cooperation with each other, the system controller 38 controls the recorder 2 by itself. Hence, in this embodiment, the recorder 2 can be used as a single recording or reproduction apparatus.

The system controller 38 has a control bus line 39. A mode selection circuit 40 indicates one of various modes to the system controller 38. As these modes, mention may be made of the NTSC output mode, PAL output mode, digital output mode, dubbing mode, recording mode, reproduction mode, digital input mode and analog input mode.

The recorder 2 further includes switch circuits 41–44, an A/D converter 45, a digital interface circuit 46, an electrical power source 47 connectable to an AC source through the external terminal 36i and having incorporated therein a rechargeable battery of relatively large capacity and a charging circuit for the battery 17, a reverse current preventing diode 48 and a magnetic disk device 49 as the memory of relatively large capacity. As has been described above, this device 49 has the disk 2 and the magnetic head 23. Of course, instead of the magnetic disk device 49, the VTR or the recording and reproduction apparatus using the optical disk may be used. Further, even the audio tape recorder will do good.

50 is a D/A converter, and 51, 52 and 53 are respectively PAL, NTSC and digital signal processing circuits.

Figure 2A:
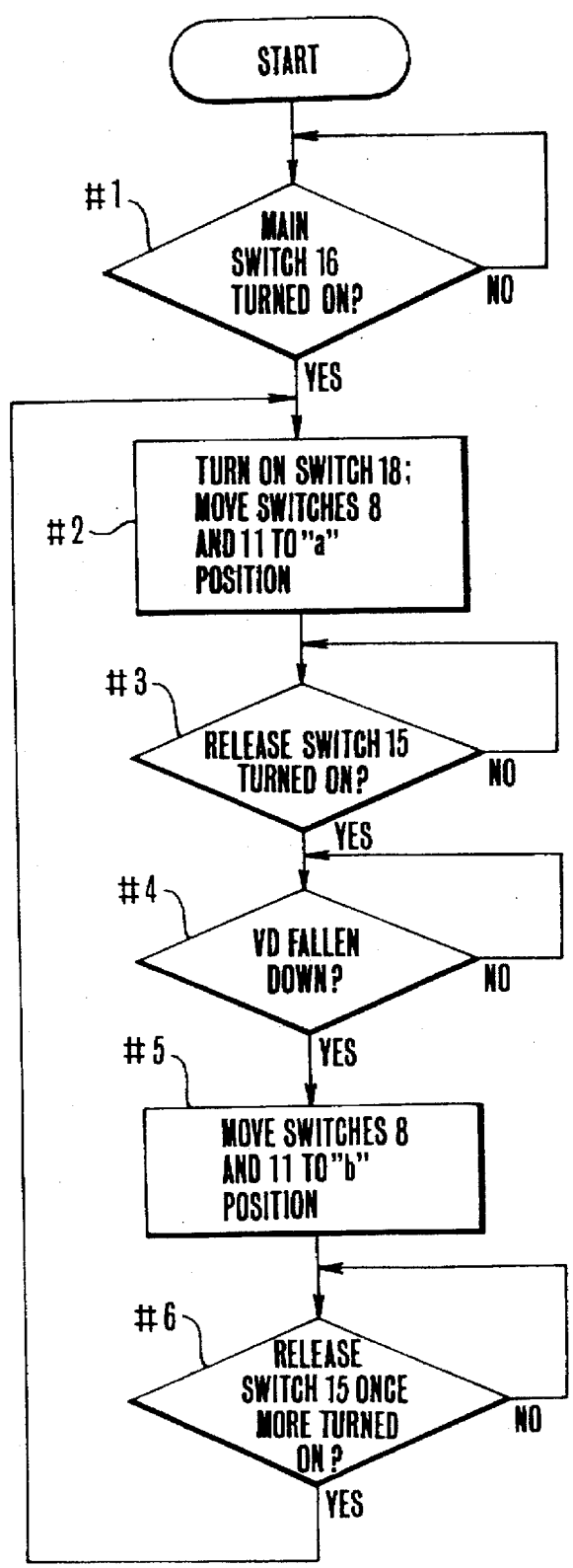
FIG. 2(a) is a main flowchart.

The electronic camera of the invention has such a structure. Its operation is next described by reference to the flowchart of FIG. 2(a).

At first, with the memory unit 27 in use, the operator turns on the main switch 16 to render operative the system controller 14 in a step #1.

Then, he turns on the power switch 18, so that the first and second changeover switches 8 and 11 are moved to their "a" position in a step #2. By this step, the various portions of the camera are supplied with electrical power from the battery 17 in the memory unit 27, starting to operate.

As an optical image of a scene is projected through the lens 3 onto the image pickup element 4, it is converted to a video signal. At this time, therefore, the video signal is applied through the contact "a" of the second changeover switch 11 to the monitor 10 and an image of the same scene is displayed on the monitor 10. That is, in this step, the monitor 10 serves as the finder of the camera.

Figure 2B:
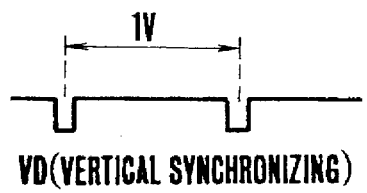
FIG. 2(b) is a synchronizing waveform.

Meanwhile, in the system controller 14, synchronizing signals are formed by using the clock signal from the clock generator 12. Of these, the vertical one VD has a period V equalized to the time of one frame as shown in FIG. 2(b).

If the frame memory 7 is replaced by a field memory, the period V of the vertical synchronizing signal VD must be halved.

Here, at a step #3, when the operator turns on the release switch 15, the system controller 14 is driven to supply the first and second changeover switches 8 and 11 with a control signal synchronized to the vertical synchronizing signal VD. Here, when the vertical synchronizing signal VD has fallen down (step #4), the first and second changeover switches 8 and 11 are moved to their "b" position (step #5). So, the signal of data of the last memorized one frame on the frame memory 7 is caused to circulate through the contact "b" of the switch 8. Thus, the image is fixed, or the so-called "freezing" of the image takes place. The signal for this freezed image is applied through the D/A converter 9 and the contact "b" of the second changeover switch 11 to the monitor 10, and the image is displayed thereon.

If the recorder 2 is in use with the imager 1, the signal for one frame of that freezed image is simultaneously routed from the D/A converter 9 to the recorder 2 and recorded on the disk 20.

During this time, the time axis is corrected since the video signal which has once been stored in the frame memory 7 is to be recorded on the disk 20.

Again, prior to picking up the next image, the operator has to once more push the release switch 15 (step #6), so that the flow returns to the completed state of the step #1.

Upon ON of the release switch 15 for the second time, the above-described procedure repeats itself to record the next image on the disk 20. Since the memory capacity is 10 frames, for the 11th frame is stored in the memory 7, the signal of the first frame is automatically deleted from its address. The signal of the 11th frame is then put to that address. Because the video signals in the frame memory 7 are successively transferred to the disk 20, it implies that the number of frames the imager 1 can pick up and store increases.

The capacity of storage of the frame memory 7 is limited to a very small number of frames. Yet, if, in future, the technology of increasing the memory capacity will make great strides, it will become possible to store several tens of frames or more.

Even in this case, as the number of addresses to be used for storing frames in the frame memory 7 becomes few, an alarm is given off. For note, when the recorder 2 is in use with the imager 1, the supply of electrical power to the imager 1 is made by the battery in the recorder 2.

In this arrangement, even the image recorded on the disk 20 can be displayed on the monitor 10 through the signal processing circuit 5. Therefore, the photographer can observe what images have been recorded on the disk 20.

Since, in the embodiment of the invention, the electronic camera is divided into the imager 1 and the disk recorder 2 and these are coordinated with each other so that after the image has once been stored in the frame memory 7, its signal is transferred to the disk recorder 2. This produces an advantage that missing of good shutter chance which would otherwise occur due to the delay of the timing of start of motion of the recording disk 20 does not take place. Another advantage is that the imager 1 is not only of small size and light weight, but also its load on the electrical power source can be reduced by lowering the peak level of electrical power. To allow for this, the image pickup element 4 must be read out at a slower speed. On this account, the camera of the invention employs the method of previously memorizing the readout signal in the frame memory 7, thereby giving an additional advantage that, despite the use of a battery of the same capacity, the maximum possible number of shot frames can be increased from that in the prior art. It is after the image has once been put into the frame memory 7 that the only necessary manipulation is to couple the imager 1 with the recorder 2. With this, the image from the frame memory 7 can be rewritten in the disk 20 at the normal speed.

Also, the content of the frame memory 7 all can be reviewed on the monitor 10. So, if he has found that it includes an undesired image, the photographer can insert a new image into that area of the disk 20 which is assigned to the undesired one.

Next, in the case when the memory unit 27 is combined with the recorder 2 at its recessed portion 37, it is possible to carry out dubbing of the data of the memory unit 27 into the magnetic disk device 49.

In more detail, with the memory unit 27 attached to the recorder 2, when the photographer sets the mode selection circuit 40 to indicate the dubbing mode, the system controller 38 sends a read signal to the memory 7 through the interconnection terminal 32'. Thereby the signal is read out from memory 7 through the interconnection terminal 32c'. This signal is then applied through the D/A converter 50 to the recording signal processing circuit 19 and therefrom, after having been subjected to modulation in the modulator 21, directed to the amplifier 22 to permit dubbing to be carried out in the magnetic disk device 49. For this time, the system controller 38 turns off the switch 43. Thereby, the battery 17 in the memory unit 27 is disconnected from the battery 47 in the recorder 2, and also from the charging circuit with the battery 47. Thus, the battery 17 in the memory unit 27 is hindered from being recharged. Otherwise, noise will enter the video signal as a quick charging takes place during the dubbing.

Next, if the digital input mode is indicated by the mode selection circuit 40, the switch 42 is connected to the digital interface circuit 46 to permit a signal from an external digital signal source (for example, personal computer) in connection with the terminal 36e to be stored in the memory 7 of the memory unit 27. For this time, the system controller 38 receives a write control signal through the terminal 32b'.

Next, if the analog input mode is indicated by the mode selection circuit 40, the switch 42 selects the A/D converter 45 to apply a signal from an external analog signal source (for example, a VTR or the imager 1) in connection with the terminal 36d to the memory 7 of the memory unit 27. At the same time, the write control signal is supplied thereto from the system controller 38 through the terminal 32b'.

Next, in the case of the NTSC output mode, responsive to a signal from the system controller 38, the switch 44 selects the circuit 52 to be connected to the D/A converter 50. Since, at the same time, the read control signal exits from the terminal 32b', the readout signal from the memory 7 enters the terminal 32c'. It is thorough the D/A converter 50 that the readout signal is then applied to the NTSC signal processing circuit 52. Its output appears at the terminal 36g. In the case of the PAL output mode, the switch 44 selects the PAL signal processing circuit 51 to be connected to the D/A converter 50. Its output is produced at the terminal 36f. In the case of the digital output mode, the circuit 53 receptive of the readout signal produces an output in digital form at the terminal 36h.

For note, when in the reproduction mode, the signal from the magnetic disk 20 is processed in passing through the amplifier 22 and the demodulator 24. The output of the latter is produced at the terminal 36a. Here, if a TV monitor is connected to this terminal 36a, the reproduced video signal can be monitored as the image. If the recorder 2 is in connection with the imager 1, the signal from the terminal 36a is applied through the terminal 35a, the signal processing circuit 5 and the switch 11 to the monitor 10. Therefore, the reproduced image can be viewed thereon.

Also, in the recording mode, the signal from an analog signal source connected to the terminal 36d, or the signal read out from the memory 7 in the memory unit 27 is applied through the signal processing circuit 19, the modulator 21 and the recording and reproducing amplifier 22 to and recorded on the magnetic disk device 49.

Here, no quick charging is made to be done on the battery 17 during the time when the video signal is being processed in any of the NTSC, PAL and digital output modes, the dubbing, recording and reproduction modes and the digital-analog input mode. This constitutes one of the features of the invention.

Again, when the imager 1 and the recorder 2 are connected to each other, the switch 41 is turned on by the system controller 38 to supply the current of the electrical power source 47 to both the gate circuit 117 and the electrical power source 17. Even this constitutes another feature.

For note, charging is not necessarily prohibited at all during the time when the video signal is processed in any mode, provided that the charging speed is slow.

Figure 3:
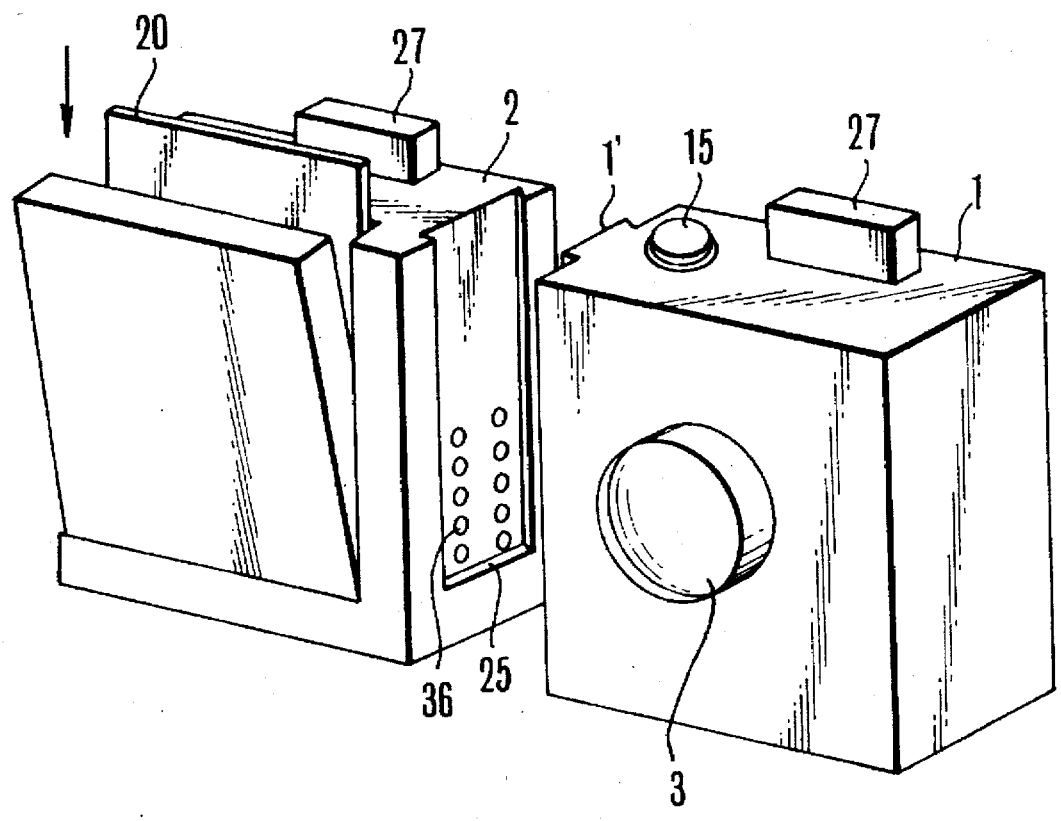
FIG. 3 is a schematic perspective view of the outer appearance of the electronic camera.

FIG. 3 shows an example of arrangement of the parts of the electronic camera. In order to mechanically couple the imager 1 and recorder 2, their housings are provided respectively with a projected portion 1' and a recessed portion 25.

FIG. 4 shows another example of construction and arrangement of mechanical couplers. The housings of the imager 1 and the memory unit 27 are provided respectively with a projected portion 1" and a recessed portion 27". The housings of the memory unit 27 and the recorder 2 are provided respectively with a projected portion 27'" and a recessed portion 54. The projected portions 1" and 27'" are of the same shape and each match with each of the recessed portions 27" and 54 of the same shape.

It is also to be noted that the above-described sets of electrical interconnection terminals are arranged in the respective individual projected or recessed portions 1', 27", 27'" and 54, so that when the mechanical coupling is complete, electrical connection between the paired sets is established.

Even in such arrangements, the present invention can be realized.

As has been described above, according to the present invention, an electronic camera which is excellent at taking snap shots and in compact form can be obtained.

What is claimed is:

1. An image pickup apparatus having a body comprising:
    (a) image pickup means for converting an optical image into an electrical image signal;
    (b) signal processing means for processing said electrical image signal to display said electrical image signal;
    (c) a recess having a plurality of direct signal terminals therein for transmitting said electrical image signal to a detachable buffer memory unit when said buffer memory unit is directly inserted into said recess;
    (d) switch means for switching between a first mode for supplying said electrical image signal generated by said image pickup means to said signal processing means through said buffer memory unit when said buffer memory unit is directly inserted into said recess and a second mode for supplying said electrical image signal generated by said image pickup means to said signal processing means bypassing said buffer memory unit.

2. An apparatus according to claim 1, wherein said buffer memory unit is a digital memory.

3. An apparatus according to claim 1, wherein said buffer memory unit has a backup power source.

4. An apparatus according to claim 1, wherein said buffer memory unit has direct contact terminals for receiving signals from said image pickup means in a state where said buffer memory unit is mechanically attached to the image pickup apparatus.

5. An image pickup apparatus according to claim 1, further comprising a main memory unit having a larger capacity than said buffer memory unit for storing said electrical image signal output from said buffer memory unit.

6. An apparatus according to claim 5, wherein said buffer memory unit is arranged to effect time base correction of the signal stored therein and output to said main memory unit.

7. An apparatus according to claim 5, wherein said main memory unit is mechanically detachable from said image pickup apparatus.

8. An apparatus according to claim 7, wherein said main memory unit has direct contact terminals for receiving signals from said buffer member unit in a state where said main memory unit is mechanically attached to the image pickup apparatus.

9. An image signal processing apparatus having a body comprising:
    (a) image signal source for generating an electrical image signal;
    (b) signal processing means for processing said electrical image signal to display said electrical image signal;
    (c) a recess arranged on said body and having a plurality of direct signal terminals therein for transmitting said electrical image signal to a detachable buffer memory unit when said buffer memory unit is directly inserted into said recess;
    (d) switch means for switching between a first mode for supplying said electrical image signal generated by said image signal source to said signal processing means through said buffer memory unit when said buffer memory unit is directly inserted into said recess and a second mode for supplying said electrical image signal generated by said image signal source to said signal processing means bypassing said buffer memory unit.

10. An image signal processing apparatus according to claim 9, wherein said image signal source includes image pickup means.

11. An image signal processing apparatus according to claim 9, wherein said buffer memory unit includes a digital memory.

12. An image signal processing apparatus according to claim 9, wherein said buffer memory unit has a backup power source.

13. An image signal processing apparatus according to claim 9, wherein said buffer memory unit has direct contact terminals for receiving signals from said image signal source when said buffer memory unit is mechanically attached to the image recording apparatus.

14. An image pickup apparatus according to claim 9, further comprising a main memory unit having a larger capacity than said buffer memory unit for storing said electrical image signal output from said buffer memory unit.

15. An image signal processing apparatus according to claim 14, wherein said buffer memory unit is arranged to effect time base correction of the signal stored therein and output to said main memory unit.

16. An image signal processing apparatus according to claim 14, wherein said main memory unit has direct contact terminals for receiving signals from said buffer memory unit when said main memory unit is mechanically attached to the image recording apparatus.

17. An image pickup apparatus having a body comprising:
  (a) image pickup means for converting an optical image into an electrical image signal;
  (b) signal processing means for processing said electrical image signal to display said electrical image signal;
  (c) a recess having a plurality of direct signal terminals therein for transmitting said electrical image signal to a detachable first memory having a relatively small capacity when said first memory is directly inserted into said recess;
  (d) switch means for switching between a first mode for supplying said electrical image signal generated by said image pickup means to said signal processing means through said first memory when said first memory is directly inserted into said recess and a second mode for supplying said electrical image signal generated by said image pickup means to said signal processing means bypassing said first memory; and
  (e) second memory having a relatively larger capacity than said first memory for storing said electrical image signal output from said first memory.

18. An apparatus according to claim 17, wherein said first memory is a digital memory.

19. An apparatus according to claim 17, wherein said first memory is arranged to effect time base correction of the signal stored therein and output to said second memory.

20. An apparatus according to claim 17, wherein said second memory is mechanically detachable from said image pickup apparatus.

21. An apparatus according to claim 20, wherein said second memory has direct contact terminals for receiving signals from said first memory in a state where said second memory is mechanically attached to the image pickup apparatus.

22. An apparatus according to claim 21, wherein said second memory has a recess which can directly receive the first memory.

23. An apparatus according to claim 22, wherein said second memory contains an interface which reads out the data from the first memory through the recess of the second memory.

24. An apparatus according to claim 17, wherein said first memory has direct contact terminals for receiving signals from said image pickup means in a state where said first memory is mechanically attached to the image pickup apparatus.

25. An apparatus according to claim 17, wherein said first memory includes a semiconductor memory.

26. An image pickup apparatus, comprising:
  an image pickup element,
  a first attaching portion having a first engaging portion for selective engagement with a first memory unit for storing an image signal formed by the image pickup element, and a first group of contacts for electrical connection with the first memory unit when the first memory unit is engaged with the first engagement portion,
  a second attaching portion having a second engagement portion for selective engagement with a second memory unit having a memory capacity larger than a memory capacity of the first memory unit and a second group of contacts for electrical connection with the second memory unit when the second memory unit is engaged with the second attaching portion, and
  a control circuit which transfers the image signal, formed by the image pickup element under conditions that the first memory unit is attached to the first attaching portion and the second memory unit is attached to the second attaching portion, from the first memory unit to the second memory unit through the first and second groups of contacts, and makes the image signal storable in the second memory unit.

27. An apparatus according to claim 26, wherein said first memory unit includes a semiconductor memory.

28. An apparatus according to claim 27, wherein said second memory unit includes a magnetic recording medium.

* * * * *